US012643388B2

(12) United States Patent
Francis et al.

(10) Patent No.: US 12,643,388 B2
(45) Date of Patent: Jun. 2, 2026

(54) DRIVE MODULE ASSEMBLY AND DRIVE MODULE SYSTEM INCLUDING THE SAME

(71) Applicant: BorgWarner Inc., Auburn Hills, MI (US)

(72) Inventors: Philip J. Francis, Lapeer, MI (US); Brian Nickoloff, Grand Blanc, MI (US); Gregory L. Beyerlein, Clarkston, MI (US); Aniruddha Chavan, Sterling Heights, MI (US); Gurmeet Singh Bedi, Rochester Hills, MI (US); Matthew A. Biederwolf, Fishers, IN (US); Wesley L. Shaw, Troy, MI (US)

(73) Assignee: BORGWARNER INC., Auburn Hills, MI (US)

( * ) Notice: Subject to any disclaimer, the term of this patent is extended or adjusted under 35 U.S.C. 154(b) by 478 days.

(21) Appl. No.: 18/209,607

(22) Filed: Jun. 14, 2023

(65) Prior Publication Data

US 2024/0416739 A1 Dec. 19, 2024

(51) Int. Cl.
*B60K 6/405* (2007.10)
*F16H 57/04* (2010.01)

(52) U.S. Cl.
CPC ......... *B60K 6/405* (2013.01); *F16H 57/0423* (2013.01)

(58) Field of Classification Search
CPC . B60K 6/405; F16H 57/0421; F16H 57/0423; F16H 57/0424; F16H 57/0426
See application file for complete search history.

(56) References Cited

U.S. PATENT DOCUMENTS 5,372,213 A 12/1994 Hasebe et al.
5,505,112 A 4/1996 Gee
(Continued)

FOREIGN PATENT DOCUMENTS

CN 114396472 A 4/2022
DE 102007011029 A1 9/2008
(Continued)

OTHER PUBLICATIONS

Machine-assisted English language abstract and Machine-assisted English language translation for DE 10 2007 011 029 A1 extracted from espacenet.com database on Nov. 25, 2024, 8 pages.
(Continued)

*Primary Examiner* — Edwin A Young
(74) *Attorney, Agent, or Firm* — Howard & Howard Attorneys PLLC

(57) ABSTRACT

A drive module assembly includes a housing defining a housing interior for containing a lubricant. The housing interior has a first interior side adjacent a first housing wall of the housing and a second interior side spaced from the first interior side and adjacent a second housing wall of the housing. The drive module assembly also includes an input shaft extending along an input axis and coupled to the housing and configured to receive rotational torque from a power source, a gear train rotatably coupled to the input shaft, and an output shaft rotatably coupled to the gear train. The drive module assembly further includes an oil housing disposed in the housing interior between the first housing wall and the second housing wall. The oil housing defines an oil housing interior that is configured to retain a portion of the lubricant.

20 Claims, 8 Drawing Sheets

(56)                    References Cited

U.S. PATENT DOCUMENTS

| | | | |
|---|---|---|---|
| 7,174,998 | B2 * | 2/2007 | Pringle ................. F04C 15/008 |
| | | | 184/6.28 |
| 8,961,360 | B2 | 2/2015 | Ooiso et al. |
| 10,746,282 | B2 | 8/2020 | Ito et al. |
| 11,155,161 | B2 | 10/2021 | Makino et al. |
| 11,231,103 | B2 | 1/2022 | Staake et al. |
| 11,619,296 | B2 | 4/2023 | Gyarmati et al. |
| 11,906,037 | B2 | 2/2024 | Liu et al. |
| 2004/0000450 | A1 | 1/2004 | Fabry |
| 2009/0218169 | A1 | 9/2009 | Kawamura et al. |
| 2016/0186855 | A1 | 6/2016 | Tahara et al. |
| 2017/0234483 | A1 | 8/2017 | Mallette et al. |
| 2018/0015815 | A1 | 1/2018 | Makino et al. |
| 2019/0128179 | A1 * | 5/2019 | Kiyokami ................. B60K 6/40 |
| 2022/0250460 | A1 * | 8/2022 | Deng ...................... F02B 63/04 |
| 2024/0117875 | A1 * | 4/2024 | Watanabe ........... F16H 57/0424 |

FOREIGN PATENT DOCUMENTS

| | | | |
|---|---|---|---|
| EP | 4166819 | A1 | 4/2023 |
| JP | H06288465 | A | 10/1994 |
| WO | 2022135082 | A1 | 6/2022 |

OTHER PUBLICATIONS

English language abstract and machine-assisted English translation for JPH 06-288465 A extracted from espacenet.com database on Nov. 24, 2024, 6 pages.

* cited by examiner

DRIVE MODULE ASSEMBLY AND DRIVE MODULE SYSTEM INCLUDING THE SAME

BACKGROUND OF THE DISCLOSURE

1. Field of the Disclosure

This invention relates generally to drive module assembly, and in particular to a drive module assembly for use in a drive module system.

2. Description of the Related Art

Typical drive module assemblies include a housing defining a housing interior for containing a lubricant, an input shaft extending coupled to the housing and configured to receive rotational torque from a power source, a gear train disposed in the housing interior and rotatably coupled to the input shaft, and an output shaft rotatably coupled to the gear train and configured to provide rotational torque to wheels of a vehicle.

Lubricant in the drive module assembly is used to lubricate and cool various components, such as the gear train, during use of the drive module assembly. In some applications, such as in vehicles, the drive module assembly may encounter various events that cause the lubricant in the housing interior to move and slosh within the housing interior. For example, the lubricant may quickly move to one side of the housing interior, which may cause some portions of the housing interior to become dryer than desired. In high performance vehicles using typical drive module assemblies, the movement of lubricant to one side of the housing interior is particularly relevant during intense driving maneuvers. When the lubricant sloshes around and quickly moves to one side of the housing interior, a sump containing lubricant becomes drier than desired. In such instances, when there is a reduced volume of lubricant in the sump, a pump is unable to pull lubricant to pump the lubricant to where the lubricant is needed to cool and lubricate various components of the drive module assembly. Additionally, when the lubricant sloshes and moves around in the housing interior, the lubricant may interact with various components of the drive module assembly, such as an electric motor, which causes shear of the lubricant and generates heat and/or the lubricant may migrate to a corner of the drive module assembly where the lubricant is not able to be used. This may result in overheating of the electric motor, even more particularly if the electric motor is lubricant cooled, which results in temporary or permanent degrading of performance of the electric motor.

To this end, there remains a need for an improved drive module assembly.

SUMMARY OF THE INVENTION

A drive module assembly includes a housing defining a housing interior for containing a lubricant. The housing interior has a first interior side adjacent a first housing wall and a second interior side spaced from the first interior side and adjacent a second housing wall. The drive module assembly also includes an input shaft extending along an input axis and coupled to the housing and configured to receive rotational torque from a power source. The drive module assembly also includes a gear train disposed in the housing interior and rotatably coupled to the input shaft. The drive module assembly additionally includes an output shaft rotatably coupled to the gear train and configured to provide rotational torque. The drive module assembly further includes an oil housing disposed in the housing interior between the first housing wall and the second housing wall. The oil housing defines an oil housing interior that is configured to retain a portion of the lubricant.

BRIEF DESCRIPTION OF THE DRAWINGS

Other advantages of the present disclosure will be readily appreciated, as the same becomes better understood by reference to the following detailed description when considered in connection with the accompanying drawings.

DETAILED DESCRIPTION OF THE INVENTION

Figure 1:
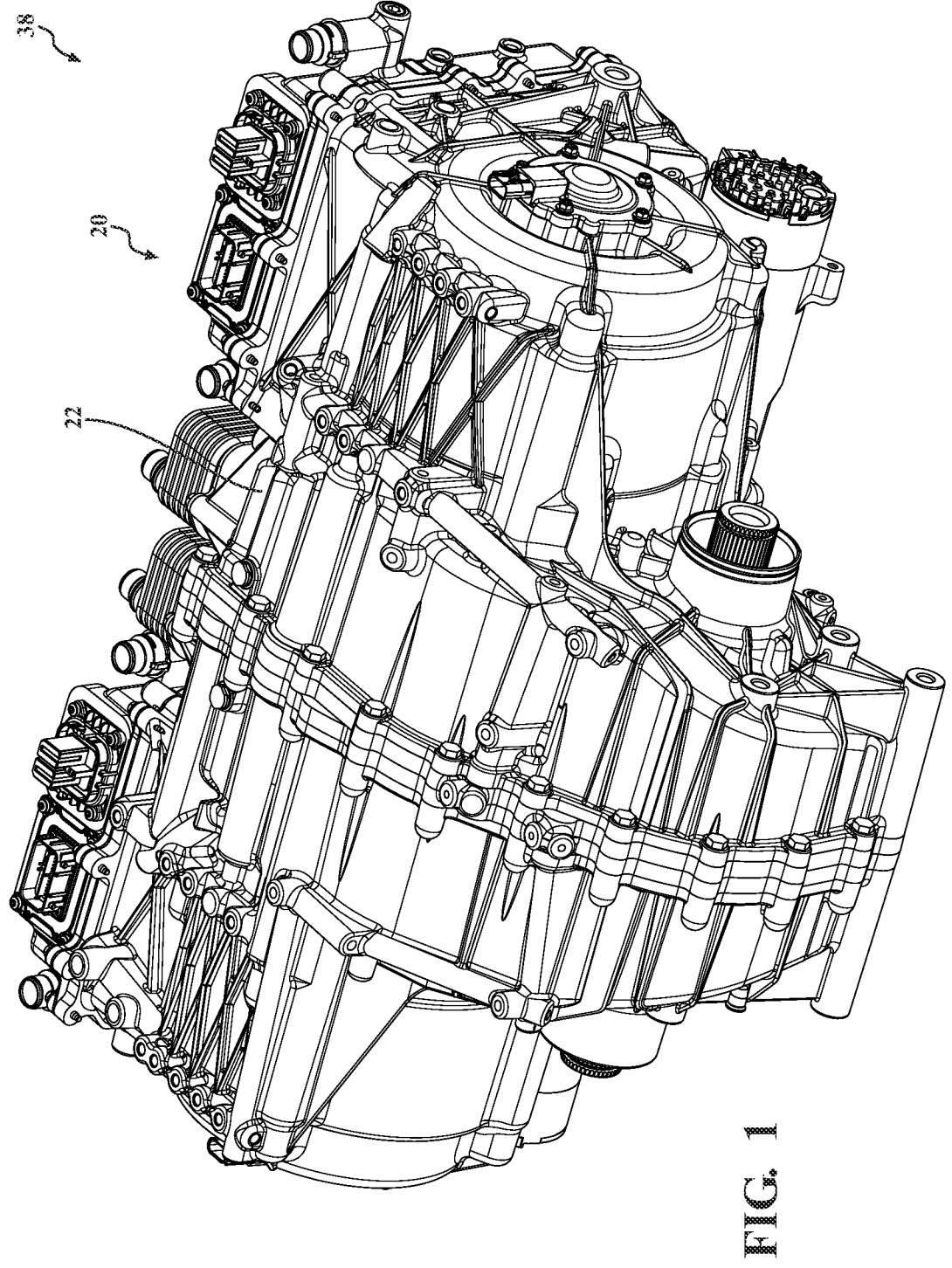
FIG. 1 is a perspective view of a drive module assembly including a housing.

With reference to the Figures, wherein like numerals indicate like parts throughout the several views, a drive module assembly 20 is generally shown in FIG. 1. It is to be appreciated that the drive module assembly 20 may be used with an internal combustion engine, electric machines and propulsion systems, transfer cases, transmissions, or any other system requiring lubrication and lubrication control.

Figure 3:
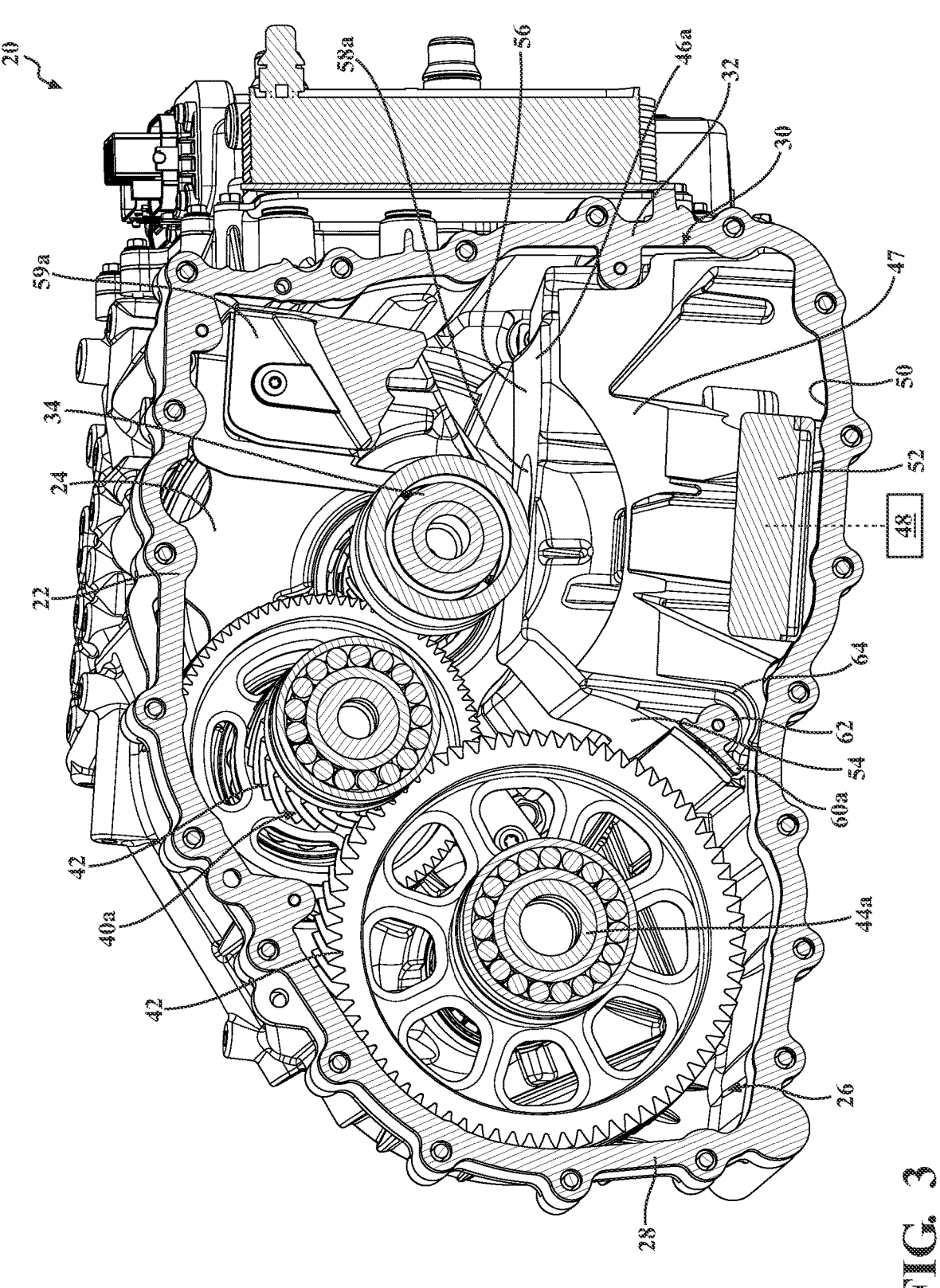
FIG. 3 is another cross-sectional view of the drive module assembly including a retaining projection.
Figure 4:
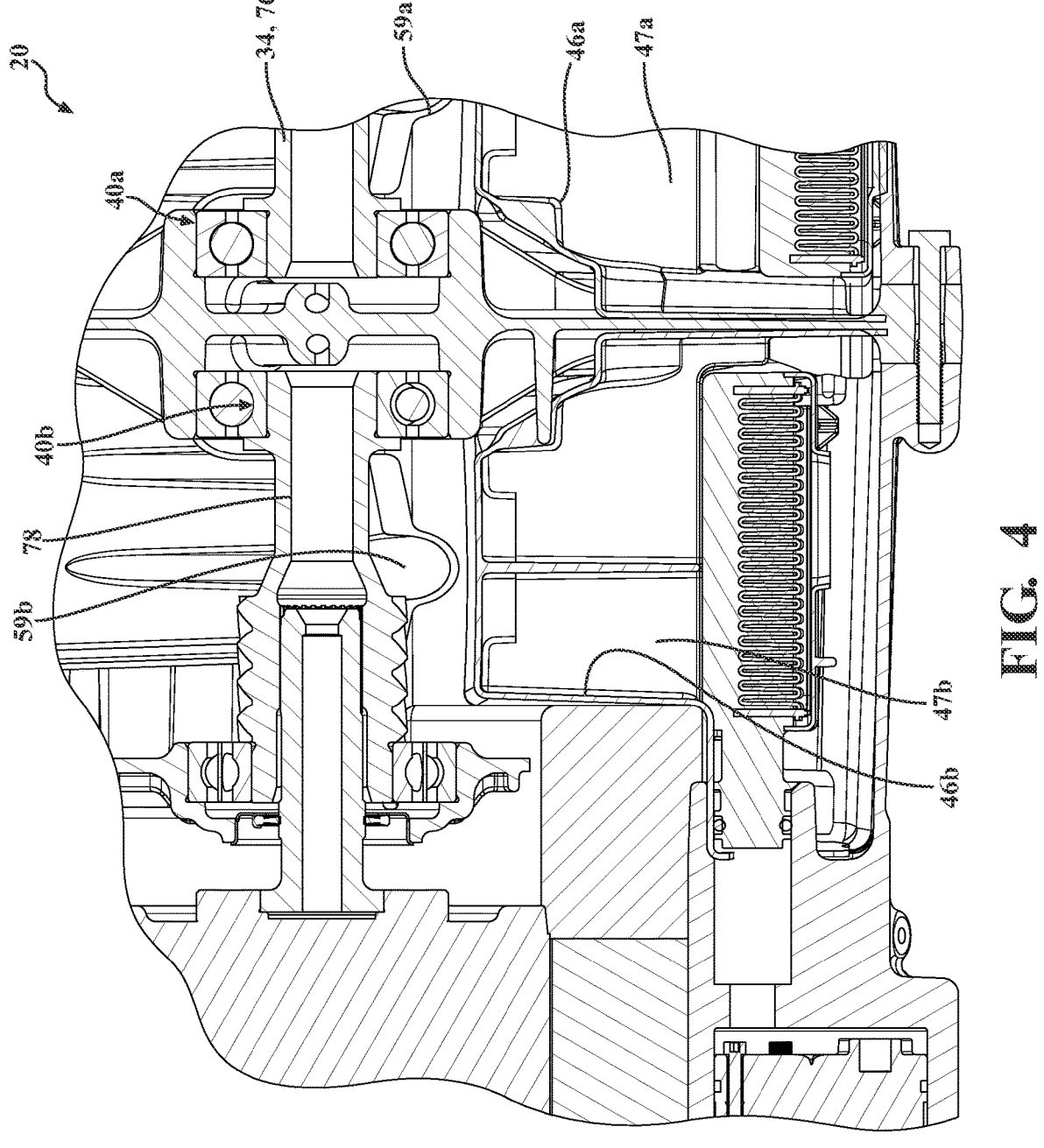
FIG. 4 is another cross-sectional view of the drive module assembly.
Figure 5:
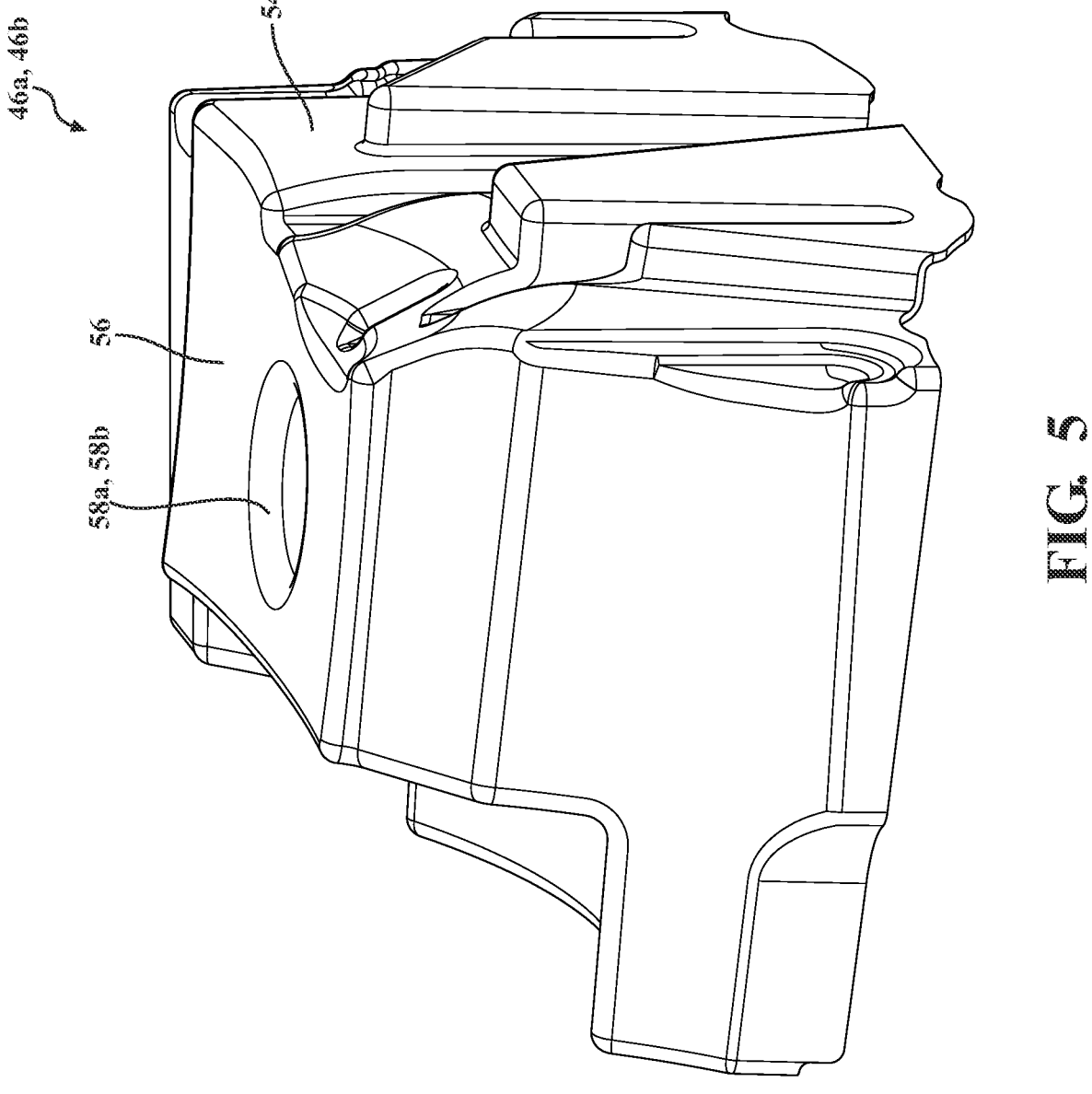
FIG. 5 is a perspective view of the oil housing.
Figure 6:
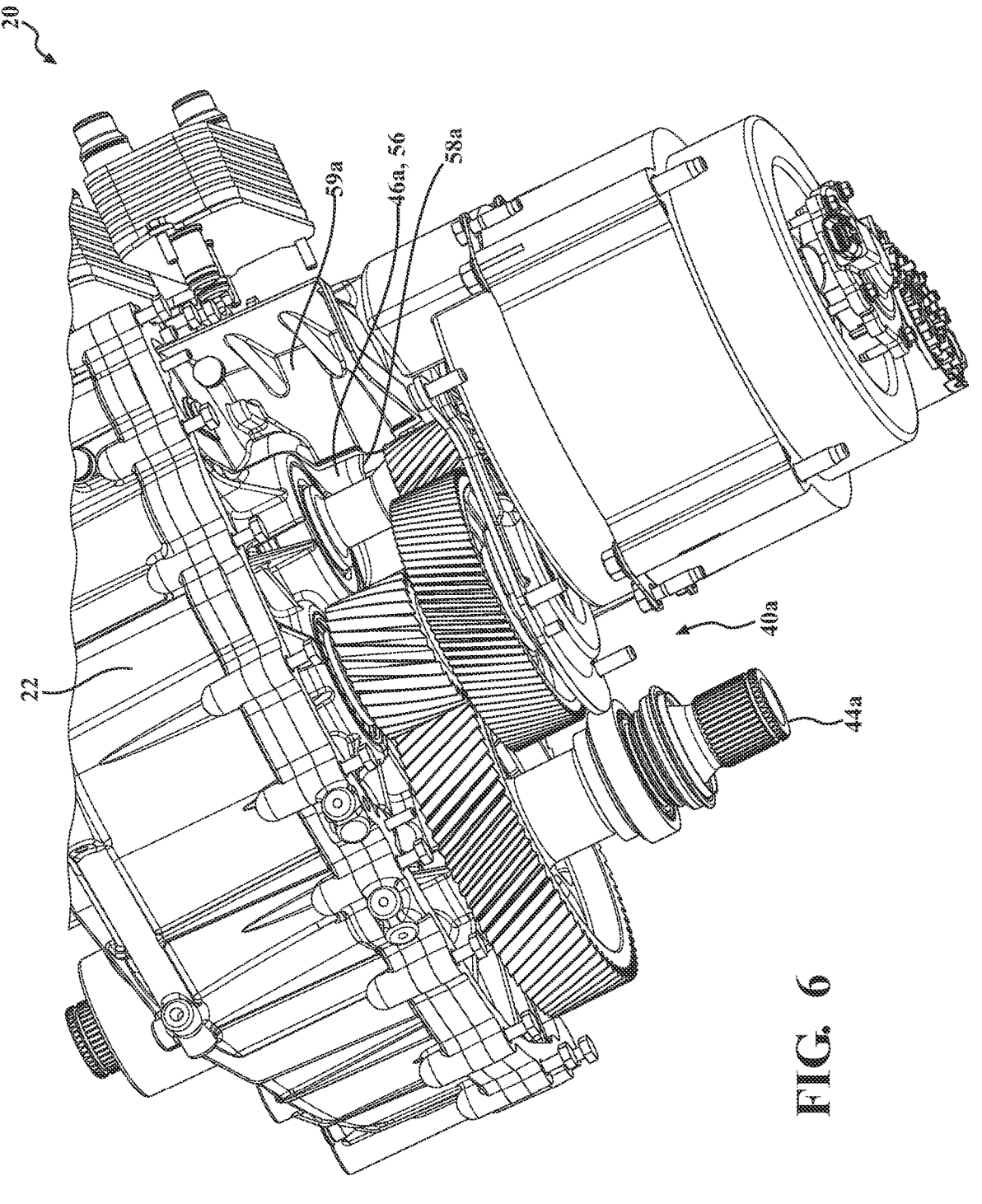
FIG. 6 is a perspective view of the drive module assembly with a portion of the housing removed.

With reference to FIG. 3, the drive module assembly 20 includes a housing 22 defining a housing interior 24 for containing a lubricant. The housing interior 24 has a first interior side 26 adjacent a first housing wall 28 of the housing 22 and a second interior side 30 spaced from the first interior side 26 and adjacent a second housing wall 32 of the housing.

Figure 2:
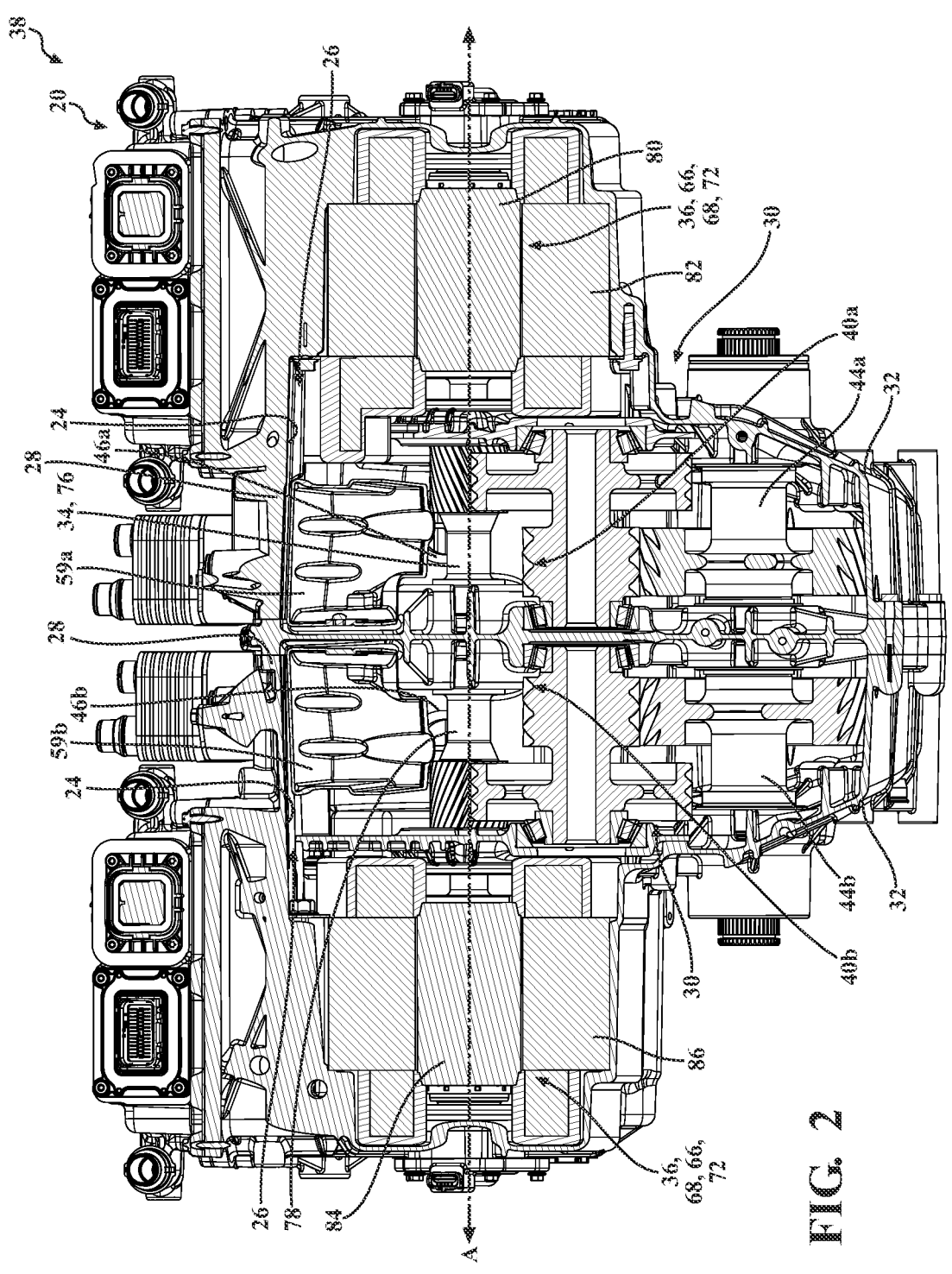
FIG. 2 is a cross-sectional view of the drive module assembly, with the drive module assembly including an input shaft, a gear train, and output shaft, and an oil housing.

With reference to FIG. 2, the drive module assembly 20 includes an input shaft 34 extending along an input axis A and coupled to the housing 22. The input shaft 34 is configured to receive rotational torque from a power source 36, such as an internal combustion engine, an electric machine, and the like. It is to be appreciated that the power source 36 and the drive module assembly 20 collectively form a drive module system 38.

The drive module assembly 20 further includes a gear train 40a disposed in the housing interior 24. The gear train 40a is rotatably coupled to the input shaft 34. The gear train 40a may be any suitable gear train for transmitting rotational torque from the input shaft 34. The gear train 34 may include any number of gears 42, such as two gears, three gears, four gears, or five or more gears, to transmit torque. The gear train 42 may include any number of shafts and layshafts, and the gear train 42 may also be an epicyclic gear train (planetary gearset). The drive module assembly 20 may include an output shaft 44a rotatably coupled to the gear train 40a. The output shaft 44a is configured to provide rotational torque. For example, the output shaft 44*a* may provide rotational torque to wheels of a vehicle.

As shown in FIGS. 3-7, the drive module assembly 20 additionally includes an oil housing 46*a* disposed in the housing interior 24 between the first housing wall 28 and the second housing wall 32. The oil housing 46*a* defines an oil housing interior 47*a* that is configured to retain a portion of the lubricant. The oil housing 46*a* may be referred to as a shroud.

Having the oil housing 46*a* defining an oil housing interior 47*a* that is configured to retain a portion of the lubricant provides several advantages. The oil housing interior 47*a* retains lubricant to supply a continuous amount of lubricant to a pump 48 of the drive module assembly 20, with the pump 48 being configured to distribute lubricant throughout the housing interior 24 to various components, such as the gear train 40*a*, bearings, and the like. Specifically, during operation of the drive module assembly 20, the drive module assembly 20 may encounter various forces that cause the lubricant to move quickly to one side of the housing interior 24, such as during intense maneuvers (e.g., 1.1G turns), intense braking and acceleration, and the like, of a vehicle including the drive module assembly 20. However, with the oil housing 46*a* defining the oil housing interior 47*a*, a portion of lubricant is retained in the oil housing interior 47*a*, which allows the pump 48 to have a continuous amount of lubricant, which allows the pump 48 to continuously disperse the lubricant throughout the drive module assembly 20 to components that require lubrication and cooling.

In one embodiment, the oil housing interior 47*a* is configured to retain at least 20% of the total lubricant in the housing interior 24. In another embodiment, the oil housing interior 47*a* is configured to retain at least 25% of the total lubricant in the housing interior 24. In another embodiment, the oil housing interior 47*a* is configured to retain at least 30% of the total lubricant in the housing interior 24. In another embodiment, the oil housing interior 47*a* is configured to retain at least 35% of the total lubricant in the housing interior 24. In another embodiment, the oil housing interior 47*a* is configured to retain at least 40% of the total lubricant in the housing interior 24. In another embodiment, the oil housing interior 47*a* is configured to retain at least 45% of the total lubricant in the housing interior 24. In another embodiment, the oil housing interior 47*a* is configured to retain at least 50% of the total lubricant in the housing interior 24. In another embodiment, the oil housing interior 47*a* is configured to retain at least 55% of the total lubricant in the housing interior 24. In another embodiment, the oil housing interior 47*a* is configured to retain at least 60% of the total lubricant in the housing interior 24. In another embodiment, the oil housing interior 47*a* is configured to retain at least 65% of the total lubricant in the housing interior 24. In another embodiment, the oil housing interior 47*a* is configured to retain at least 70% of the total lubricant in the housing interior 24. In another embodiment, the oil housing interior 47*a* is configured to retain at least 75% of the total lubricant in the housing interior 24. In another embodiment, the oil housing interior 47*a* is configured to retain at least 80% of the total lubricant in the housing interior 24.

Figure 7:
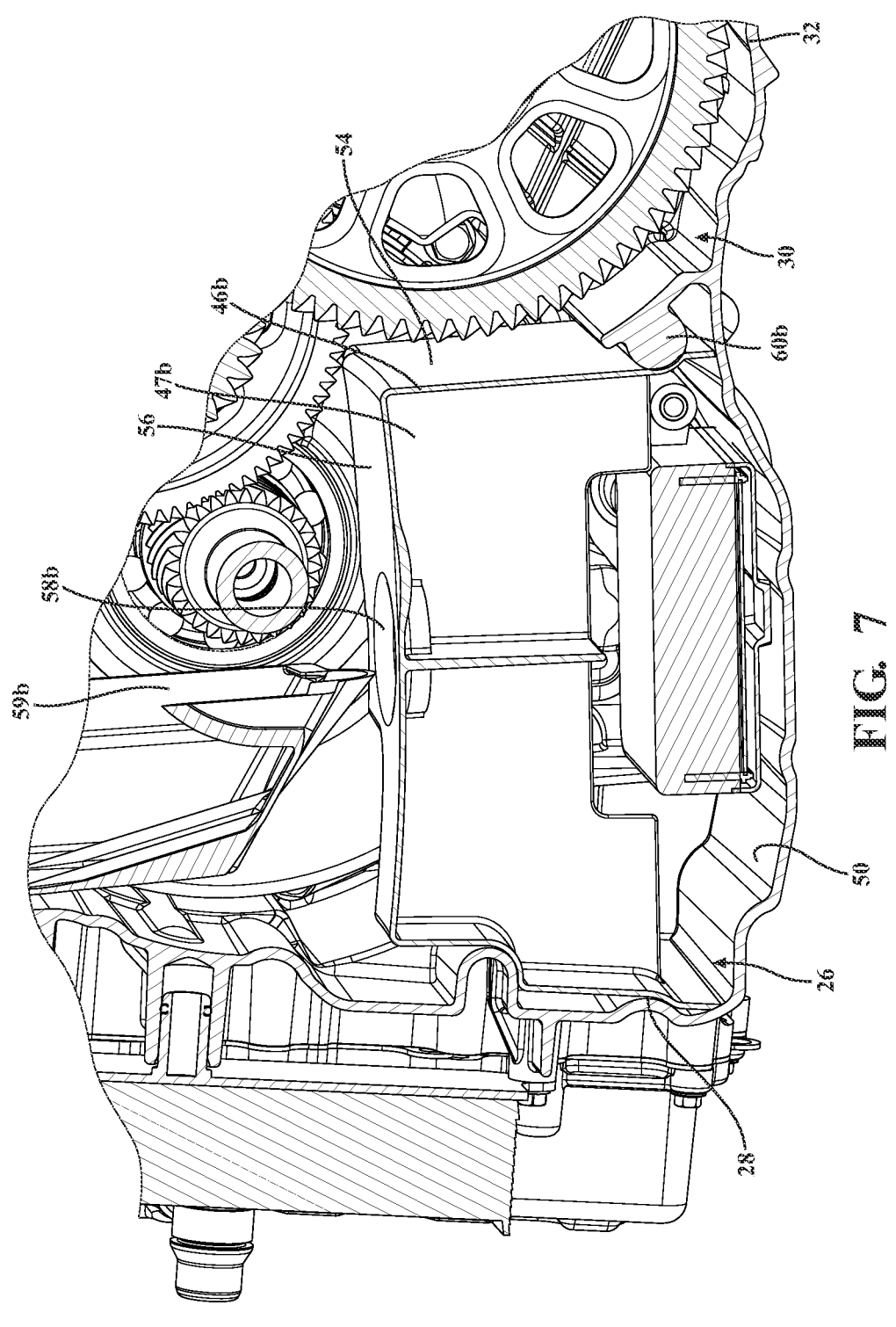
FIG. 7 is another cross-sectional view of the drive module assembly.

With particular reference to FIG. 7, the housing 22 typically has a bottom surface 50 extending between the first interior side 26 and said second interior side 30. The oil housing 46*a* is typically engaged with the bottom surface 50 and the bottom surface 50 and the oil housing 46*a* define the oil housing interior 47*a*. In one embodiment, the oil housing

46*a* is removably coupled to the housing 22. In other words, the oil housing 46*a* and the housing 22 are separate components (i.e., two pieces). In such embodiments, the oil housing 46*a* may be coupled to the housing 22 in any suitable manner, such as through engagement with pins of the housing 22, through fasteners, and the like. When the oil housing 46*a* is coupled to the housing 22 through pins of the housing 22, the pins apply a downward force to the oil housing 46*a* such that the oil housing 46*a* is engaged with the bottom surface 50 of the housing 22. The drive module assembly 20 may include seals, such as a moldable rubber bead, between the oil housing 46*a*, the housing 22, and/or pins of the housing 22 for further preventing flow of the lubricant between the housing 22 and the oil housing 46*a*.

Having the oil housing 46*a* engaged with the bottom surface of the housing 22 offers several advantages. First, the engagement of the oil housing 46*a* to the housing 22 reduces or minimizes the potential of lubricant to flow between the oil housing 46*a* and the bottom surface 50 of the housing 22 such that lubricant is able to flow from the oil housing interior 47*a*, between the oil housing 46*a* and the bottom surface 50 of the housing 22, and into the housing interior 24. It is to be appreciated that the engagement between the oil housing 46*a* and the bottom surface 50 of the housing 22 may be adjusted. For example, a tighter engagement between the oil housing 46*a* and the bottom surface 50 of the housing 22 reduces the ability for lubricant to flow from the oil housing interior 47*a* into the housing interior 24. However, depending on the application of the drive module assembly 20, it may be desirable to allow a predetermined amount of lubricant to flow between the oil housing 46*a* and the bottom surface 50 of the housing 22. For example, during a full or partial failure of the pump 48, the lubricant would not be completely trapped in the oil housing interior 47*a*, which allows some lubricant to exit the oil housing interior 47*a* to be splashed and thrown by the gear train 40*a* to provide limited lubrication and cooling to various components of the drive module assembly 20. Additionally, such a configuration of the oil housing 46*a* allows more efficient manufacturing and allows flexibility on where to place the oil housing 46*a* in the housing interior 24.

It is to be appreciated that in some embodiments the oil housing 46*a* may be integral with the housing 22 (i.e., one piece). In such embodiments, lubricant in the oil housing interior 47*a* is unable to exit the oil housing interior 47*a* between the oil housing 46*a* and the bottom surface 50 of the housing 22. In one embodiment, the filter 52 and the oil housing 46*a* may be a single component.

The drive module assembly 20 may also include a filter 52. The filter 52 may be disposed in the oil housing interior 47*a*.

Figure 8:
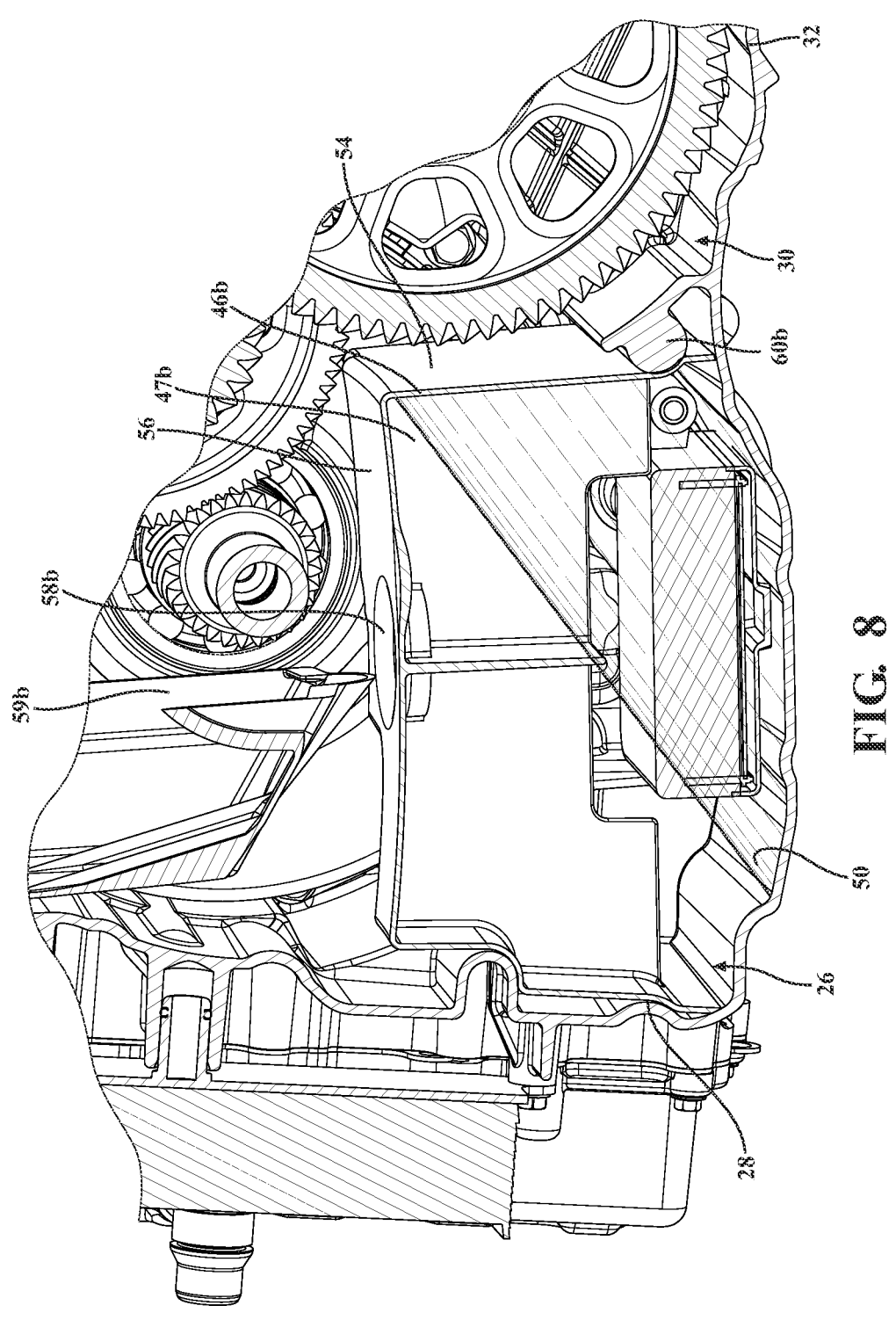
FIG. 8 is the cross-sectional view of the drive module assembly of FIG. 7 with lubricant disposed in an oil housing interior of the oil housing.

To help replenish lubricant in the oil housing interior 47*a* due to lubricant exiting the oil housing interior 47*a*, such as by the pump 48 pulling lubricant from the oil housing interior 47*a* or lubricant exiting the oil housing interior 47*a* between the oil housing 46*a* and the bottom surface 50 of the housing 22, the drive module assembly 20 may include a scavenge pump. Alternatively, or in addition to including a scavenge pump, the oil housing 46*a* may have a vertical wall 54 extending perpendicular with respect to the input axis A partially defining the oil housing interior 47*a*, and an upper wall 56 extending perpendicular to the vertical wall 54 and further defining the oil housing interior 47*a*. The vertical wall 54 may be shaped to cooperate with an adjacent gear of the gear train 40*a*. For example, the vertical wall 54 may be curved to accommodate a gear of the gear train 40*a*. The upper wall 56 helps further retain the lubricant in the oil housing interior 47a quick movements of the drive module assembly 20. To replenish the lubricant in the oil housing interior 47a, the upper wall 56 may define a collection hole 58a for collecting lubricant to retain lubricant in the oil housing interior 47a. Typically, the collection hole 58a is adjacent the gear train 40a to collect lubricant that drips off of the gear train 40a. However, it is to be appreciated that the collection hole 58a may be located in any suitable location to collect the lubricant 58a The upper wall 56 may be angled with respect to the input axis A such that when lubricant is disposed on the upper wall 56 the lubricant is encouraged to migrate toward and through the collection hole 58a. The drive module assembly 20 may include a collection plate 59a coupled to the housing 22 and disposed adjacent the oil housing 46a. When present, the collection plate 59a helps direct lubricant into and through the collection hole 58a. The collection hole 58a is sized such that, during an intense maneuver, the lubricant in the oil housing interior 47a is held in the oil housing interior 47b by the upper wall 56. As shown in FIG. 8, the lubricant is held in the oil housing interior 47b during an intense maneuver, such as a braking event or turning event. The upper wall 56 prevents the lubricant from exiting the oil housing interior 47b during an intense maneuver.

The drive module assembly 20 may include a retaining projection 60a disposed in the housing interior 24 and adjacent the oil housing 46a. When present, the retaining projection 60a is configured to retain a predetermined amount lubricant adjacent the oil housing 46a. Specifically, as shown in FIGS. 3 and 7, if any lubricant exits the oil housing interior 47a between the oil housing 46a and the bottom surface 50 of the housing 22, the retaining projection 60a prevents any further egress of the lubricant into the housing interior 24. The lubricant retained by the retaining projection 60a then is able, depending on how tightly the oil housing 46a and bottom surface 50 of the housing 22 are engaged, to flow between the oil housing 46a and the bottom surface 50 of the housing 22 and into the oil housing interior 47a. The desired flow is predetermined by the level of engagement between the retaining projection 60a and the housing 22 and, when present, a seal, such as a moldable rubber bead. The retaining projection 60a may be integral with the housing 22 (i.e., one piece) or the retaining projection 60a may be a separate component from the housing 22 (i.e., two pieces). The retaining projection 60a may have a protruding portion 62 extending toward the oil housing 46a to further retain lubricant between the retaining projection 60a and the oil housing 46a. The protruding portion 62 may cooperate in shape with the oil housing 46a. For example, as shown in FIGS. 3 and 7, the protruding portion 62 has a circular configuration that cooperates with a curved portion 64 of the oil housing 46a.

The power source 36 of the drive module system 38 may be any suitable power source for providing rotational torque to the input shaft 34. For example, the power source 36 may be further defined as internal combustion engine. In another embodiment, as shown in FIG. 2, the power source 36 may be further defined as an electric machine 66.

The drive module assembly 20 may include a second input shaft 78 coupled to the housing 22 and rotatably coupled to the gear train 40a. In such embodiments, the power source 36 may be further defined as a first power source 68 and the input shaft 34 may be further defined as a first input shaft 76. Additionally, in such embodiments, the drive module assembly 20 may include a second power source 70. The first power source 68 is configured to provide rotational torque to the first input shaft 76, and the second power source 70 is configured to provide rotational torque to the second input shaft 78. The first power source 68 may be further defined as a first electric machine 72 and the second power source 70 may be further defined as a second electric machine 74. The first electric machine 72 typically has a first rotor 80 coupled to the first input shaft 76 and a first stator 82 disposed about the first rotor 80. Similarly, the second electric machine 74 typically has a second rotor 84 coupled to the second input shaft 78 and a second stator 86 disposed about the second rotor 84. Both the first and second electric machines 72, 74 may be configured as an electric motor and/or as a generator.

The drive module assembly 20 may include a second gear train 40b, a second output shaft 44b, a second oil housing 46b, a second oil housing interior 47b, a second collection hole 58b, a second collection plate 59b, and a second retaining projection 60b. It is to be appreciated that the description of the gear train 40a, output shaft 44a, oil housing 46a, oil housing interior 47a, collection hole 58a, second collection plate 59a, and retaining projection 60a equally applies to the second gear train 40b, the second output shaft 44b, the second oil housing 46b, the second oil housing interior 47b, the second collection hole 58b, the second collection plate 59b, and the second retaining projection 60b, respectively.

What is claimed is:

1. An oil control assembly comprising:
   a housing defining a housing interior for containing a lubricant, wherein said housing interior has a first interior side adjacent a first housing wall of said housing and a second interior side spaced from said first interior side and adjacent a second housing wall of said housing;
   an input shaft extending along an input axis and coupled to said housing and configured to receive rotational torque from a power source;
   a gear train disposed in said housing interior and rotatably coupled to said input shaft;
   an output shaft rotatably coupled to said gear train and configured to provide rotational torque; and
   an oil housing disposed in said housing interior between said first housing wall and said second housing wall, wherein said oil housing defines an oil housing interior that is configured to retain a portion of the lubricant;
   wherein said housing has a bottom surface extending between said first interior side and said second interior side;
   wherein said oil housing has a vertical wall extending perpendicular with respect to said input axis partially defining said oil housing interior, and an upper wall extending perpendicular to said vertical wall and further defining said oil housing interior; and
   wherein said upper wall of said oil housing is disposed between said input shaft and said bottom surface.

2. The oil control assembly as set forth in claim 1 further comprising a retaining projection disposed in said housing interior and adjacent said oil housing, wherein said retaining projection is configured to retain lubricant adjacent said oil housing.

3. The oil control assembly as set forth in claim 1, wherein said oil housing is engaged with said bottom surface, and wherein said bottom surface and said oil housing define said oil housing interior.

4. The oil control assembly as set forth in claim 1, wherein said upper wall defines a collection hole for collecting lubricant to retain lubricant in said oil housing interior.

5. The oil control assembly as set forth in claim 4, wherein said upper wall is angled with respect to said input axis such that when lubricant is disposed on said upper wall the lubricant is encouraged to migrate toward and through said collection hole.

6. The oil control assembly as set forth in claim 1, wherein said housing further defines said oil housing interior with said vertical wall and said upper wall.

7. The oil control assembly as set forth in claim 1, wherein said oil housing is removably coupled to said housing.

8. The oil control assembly as set forth in claim 1, wherein said oil housing is integral with said housing.

9. The oil control assembly as set forth in claim 1 further comprising a pump configured to circulate lubricant throughout said housing interior.

10. The oil control assembly as set forth in claim 1 further comprising a filter disposed in said oil housing interior.

11. The oil control assembly as set forth in claim 1, wherein said geartrain is disposed entirely outside of said oil housing interior.

12. A drive module system comprising:

a power source; and a drive module assembly comprising, a housing defining a housing interior for containing a lubricant, wherein said housing interior has a first interior side adjacent a first housing wall of said housing and a second interior side spaced from said first interior side and adjacent a second housing wall of said housing;

an input shaft extending along an input axis and coupled to said housing and configured to receive rotational torque from said power source;

a gear train disposed in said housing interior and rotatably coupled to said input shaft;

an output shaft rotatably coupled to said gear train and configured to provide rotational torque to wheels of a vehicle; and an oil housing disposed in said housing interior between said first housing wall and said second housing wall, wherein said oil housing defines an oil housing interior that is configured to retain a portion of the lubricant;

wherein said housing has a bottom surface extending between said first interior side and said second interior side;

wherein said oil housing has a vertical wall extending perpendicular with respect to said input axis partially defining said oil housing interior, and an upper wall extending perpendicular to said vertical wall and further defining said oil housing interior; and wherein said upper wall of said oil housing is disposed between said input shaft and said bottom surface.

13. The drive module system as set forth in claim 12, wherein said power source is further defined as an internal combustion engine.

14. The drive module system as set forth in claim 12, wherein said power source is further defined as an electric machine.

15. The drive module system as set forth in claim 12, wherein said drive module assembly further comprises a second input shaft coupled to said housing and rotatably coupled to said gear train, wherein said power source is further defined as a first power source and said input shaft is further defined as a first input shaft, and further comprising a second power source, wherein said first power source is configured to provide rotational torque to said first input shaft, and wherein said second power source is configured to provide rotational torque to said second input shaft.

16. The drive module system as set forth in claim 15, wherein said first power source is further defined as a first electric machine, and wherein said second power source is further defined as a second electric machine.

17. The drive module system as set forth in claim 12, wherein said drive module assembly further comprises a retaining projection disposed in said housing interior and adjacent said oil housing, wherein said retaining projection is configured to retain a predetermined amount of lubricant adjacent to said oil housing.

18. The drive module system as set forth in claim 12, wherein said oil housing is engaged with said bottom surface, and wherein said bottom surface and said oil housing define said oil housing interior.

19. The drive module system as set forth in claim 12, wherein said upper wall defines a collection hole for collecting lubricant to retain lubricant in said oil housing interior.

20. A vehicle including said drive module system as set forth in claim 12, and further comprising wheels configured to receive rotational torque from said drive module system.

\* \* \* \* \*